(12) United States Patent
Sedarat et al.

(10) Patent No.: US 8,861,663 B1
(45) Date of Patent: Oct. 14, 2014

(54) CORRELATED NOISE CANCELLER FOR HIGH-SPEED ETHERNET RECEIVERS

(75) Inventors: Hossein Sedarat, San Jose, CA (US); Fadi Saibi, Sunnyvale, CA (US)

(73) Assignee: Aquantia Corporation, Milpitas, CA (US)

( * ) Notice: Subject to any disclaimer, the term of this patent is extended or adjusted under 35 U.S.C. 154(b) by 0 days.

(21) Appl. No.: 13/350,624

(22) Filed: Jan. 13, 2012

Related U.S. Application Data

(63) Continuation of application No. 13/309,449, filed on Dec. 1, 2011.

(51) Int. Cl.
*H04B 1/10* (2006.01)

(52) U.S. Cl.
USPC .................. 375/350; 75/346; 75/347; 75/348; 75/349; 75/350

(58) Field of Classification Search
CPC ............ H04B 3/32; H04B 3/23; H04B 3/235; H04L 25/03038; H04L 2025/0349
USPC .................................................. 375/346–350
See application file for complete search history.

(56) References Cited

U.S. PATENT DOCUMENTS

| | | | |
|---|---|---|---|
| 3,506,906 A | 4/1970 | Nestor | |
| 3,671,859 A | 6/1972 | Miller | |
| 4,797,902 A | 1/1989 | Nishiguchi et al. | |
| 4,870,370 A | 9/1989 | Hedberg et al. | |
| 5,157,690 A * | 10/1992 | Buttle | 375/232 |
| 5,283,811 A * | 2/1994 | Chennakeshu et al. | 375/233 |
| 5,550,924 A | 8/1996 | Helf et al. | |
| 5,777,692 A * | 7/1998 | Ghosh | 348/725 |
| 5,832,032 A | 11/1998 | Overbury | |
| 5,889,511 A | 3/1999 | Ong et al. | |
| 5,910,960 A | 6/1999 | Claydon et al. | |
| 5,995,566 A | 11/1999 | Rickard et al. | |
| 5,995,567 A | 11/1999 | Cioffi et al. | |
| 6,011,508 A | 1/2000 | Perreault et al. | |
| 6,035,360 A | 3/2000 | Doidge et al. | |
| 6,052,420 A | 4/2000 | Yeap et al. | |
| 6,069,917 A * | 5/2000 | Werner et al. | 375/233 |
| 6,285,718 B1 | 9/2001 | Reuven | |
| 6,385,315 B1 | 5/2002 | Viadella et al. | |
| 6,424,234 B1 | 7/2002 | Stevenson | |
| 6,486,746 B1 | 11/2002 | Gilbert | |

(Continued)

FOREIGN PATENT DOCUMENTS

WO  WO 97/40587  10/1997
WO  WO2011/056970 A2  5/2011

OTHER PUBLICATIONS

U.S. Appl. No. 12/563,938, filed Sep. 21, 2009, Sedarat.
U.S. Appl. No. 12/604,323, filed Oct. 22, 2009, Sedarat et al.

(Continued)

*Primary Examiner* — Shuwang Liu
*Assistant Examiner* — Sung Ahn
(74) *Attorney, Agent, or Firm* — Lance Kreisman; Peninsula Patent Group

(57) ABSTRACT

A method of operation in an ethernet receiver circuit is disclosed. The method comprises sampling an input signal to generate a sampled signal having a sampled noise component and a sampled data component. The sampled signal is sliced, and a slicer error determined based on the slicing of the sampled signal. A subsequently sampled noise component is filtered based on the slicer error.

15 Claims, 9 Drawing Sheets

(56) References Cited

U.S. PATENT DOCUMENTS

| | | | |
|---|---|---|---|
| 6,683,913 B1 | 1/2004 | Kantschuk | |
| 6,690,739 B1 | 2/2004 | Mui | |
| 6,711,207 B1 | 3/2004 | Amrany et al. | |
| 6,734,659 B1 | 5/2004 | Fortner | |
| 6,771,720 B1 | 8/2004 | Yang et al. | |
| 6,924,724 B2 | 8/2005 | Grilo et al. | |
| 6,934,345 B2* | 8/2005 | Chu et al. | 375/346 |
| 6,959,056 B2 | 10/2005 | Yeap et al. | |
| 6,999,504 B1 | 2/2006 | Amrany et al. | |
| 7,026,730 B1 | 4/2006 | Marshall et al. | |
| 7,031,402 B2 | 4/2006 | Takada | |
| 7,103,013 B1 | 9/2006 | Kim et al. | |
| 7,123,117 B2 | 10/2006 | Chen et al. | |
| 7,164,764 B2* | 1/2007 | Zimmerman et al. | 379/417 |
| 7,173,992 B2* | 2/2007 | Frigon | 375/354 |
| 7,180,940 B2 | 2/2007 | Li et al. | |
| 7,200,180 B2 | 4/2007 | Verbin et al. | |
| 7,315,592 B2 | 1/2008 | Tsatsanis et al. | |
| 7,333,603 B1 | 2/2008 | Sallaway et al. | |
| RE40,149 E | 3/2008 | Vitenberg | |
| 7,440,892 B2 | 10/2008 | Tamura | |
| 7,457,386 B1 | 11/2008 | Phanse | |
| 7,459,982 B2 | 12/2008 | Miao | |
| 7,492,840 B2 | 2/2009 | Chan | |
| 7,522,928 B2 | 4/2009 | O'Mahony | |
| 7,542,528 B1* | 6/2009 | Cheong | 375/341 |
| 7,634,032 B2 | 12/2009 | Chu et al. | |
| 7,656,956 B2 | 2/2010 | King | |
| 7,706,434 B1* | 4/2010 | Farjadrad et al. | 375/222 |
| 7,708,595 B2 | 5/2010 | Chow et al. | |
| 8,094,546 B2* | 1/2012 | Schenk | 370/201 |
| 8,139,602 B2 | 3/2012 | Meier | |
| 8,331,508 B2 | 12/2012 | Dabiri | |
| 8,472,532 B2 | 6/2013 | Schley-May et al. | |
| 8,625,704 B1 | 1/2014 | Sedarat et al. | |
| 2003/0186591 A1 | 10/2003 | Jensen et al. | |
| 2003/0223488 A1 | 12/2003 | Li et al. | |
| 2003/0223505 A1 | 12/2003 | Verbin et al. | |
| 2004/0010203 A1 | 1/2004 | Bibian et al. | |
| 2004/0023631 A1 | 2/2004 | Deutsch et al. | |
| 2004/0156461 A1* | 8/2004 | Agazzi et al. | 375/350 |
| 2004/0164619 A1 | 8/2004 | Parker et al. | |
| 2004/0213366 A1 | 10/2004 | Ono | |
| 2004/0239465 A1 | 12/2004 | Chen et al. | |
| 2004/0252755 A1* | 12/2004 | Jaffe et al. | 375/233 |
| 2004/0257743 A1 | 12/2004 | Chen et al. | |
| 2005/0018777 A1 | 1/2005 | Azadet | |
| 2005/0025266 A1 | 2/2005 | Chan | |
| 2005/0053229 A1 | 3/2005 | Tsatsanis et al. | |
| 2005/0097218 A1 | 5/2005 | Sultenfuss et al. | |
| 2005/0123081 A1* | 6/2005 | Shirani | 375/346 |
| 2005/0135489 A1 | 6/2005 | Ho et al. | |
| 2005/0203744 A1 | 9/2005 | Tamura | |
| 2005/0243483 A1 | 11/2005 | Chen et al. | |
| 2006/0018388 A1 | 1/2006 | Chan | |
| 2006/0056503 A1 | 3/2006 | Keshab et al. | |
| 2006/0159186 A1 | 7/2006 | King | |
| 2006/0182014 A1* | 8/2006 | Lusky et al. | 370/201 |
| 2006/0256880 A1 | 11/2006 | Frisch | |
| 2007/0014378 A1* | 1/2007 | Parhi et al. | 375/267 |
| 2007/0081475 A1 | 4/2007 | Telado et al. | |
| 2007/0146011 A1 | 6/2007 | O'Mahony et al. | |
| 2007/0192505 A1 | 8/2007 | Dalmia | |
| 2007/0258517 A1* | 11/2007 | Rollings et al. | 375/233 |
| 2007/0280388 A1 | 12/2007 | Torre et al. | |
| 2008/0089433 A1 | 4/2008 | Cho et al. | |
| 2008/0095283 A1* | 4/2008 | Shoor | 375/350 |
| 2008/0107167 A1 | 5/2008 | Tung et al. | |
| 2008/0160915 A1* | 7/2008 | Sommer et al. | 455/63.1 |
| 2008/0160945 A1* | 7/2008 | Crinon et al. | 455/234.1 |
| 2008/0198909 A1 | 8/2008 | Tsatsanis et al. | |
| 2008/0267212 A1 | 10/2008 | Crawley et al. | |
| 2009/0061808 A1 | 3/2009 | Higgins | |
| 2009/0097401 A1 | 4/2009 | Diab | |
| 2009/0097539 A1 | 4/2009 | Furman et al. | |
| 2009/0154455 A1 | 6/2009 | Diab | |
| 2009/0161781 A1 | 6/2009 | Kolze | |
| 2010/0046543 A1 | 2/2010 | Parnaby | |
| 2010/0073072 A1 | 3/2010 | Ullen et al. | |
| 2010/0074310 A1 | 3/2010 | Roo et al. | |
| 2010/0086019 A1 | 4/2010 | Agazzi et al. | |
| 2010/0111202 A1 | 5/2010 | Schley-May et al. | |
| 2010/0159866 A1 | 6/2010 | Fudge et al. | |
| 2011/0032048 A1 | 2/2011 | Wu et al. | |
| 2011/0069794 A1 | 3/2011 | Tavassoli Kilani et al. | |
| 2011/0106459 A1 | 5/2011 | Chris et al. | |
| 2011/0212692 A1 | 9/2011 | Hahn et al. | |
| 2011/0256857 A1 | 10/2011 | Chen et al. | |
| 2011/0293041 A1 | 12/2011 | Luo et al. | |
| 2011/0296267 A1 | 12/2011 | Malkin et al. | |

OTHER PUBLICATIONS

U.S. Appl. No. 12/604,343, filed Oct. 22, 2009, Farjadrad et al.
U.S. Appl. No. 12/604,351, filed Oct. 22, 2009, Sedarat et al.
U.S. Appl. No. 12/604,358, filed Oct. 22, 2009, Sedarat et al.
U.S. Appl. No. 12/977,844, filed Dec. 23, 2010, Sedarat.

* cited by examiner

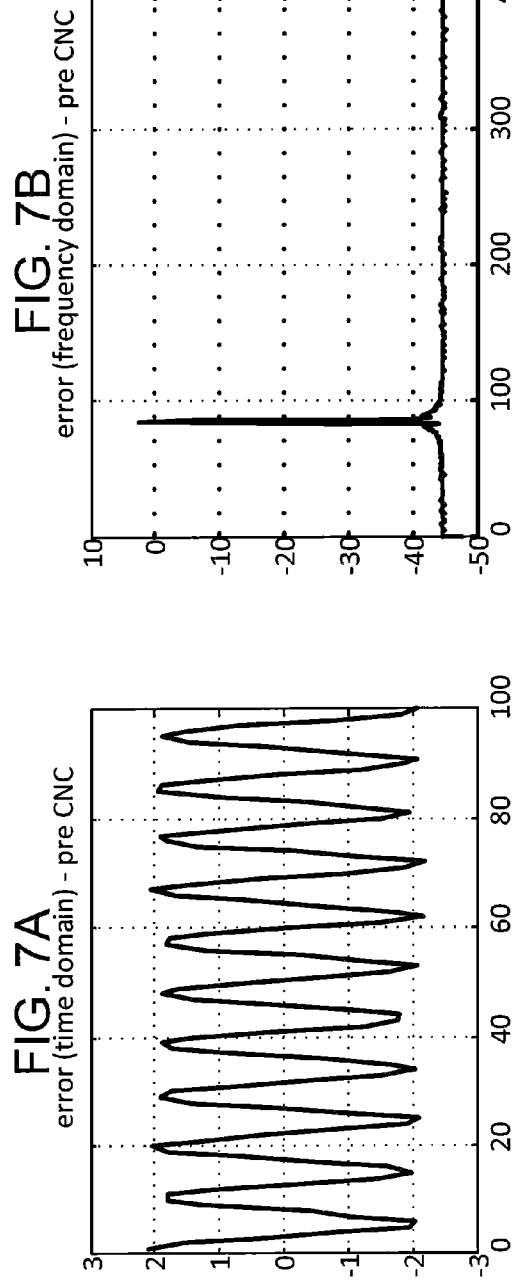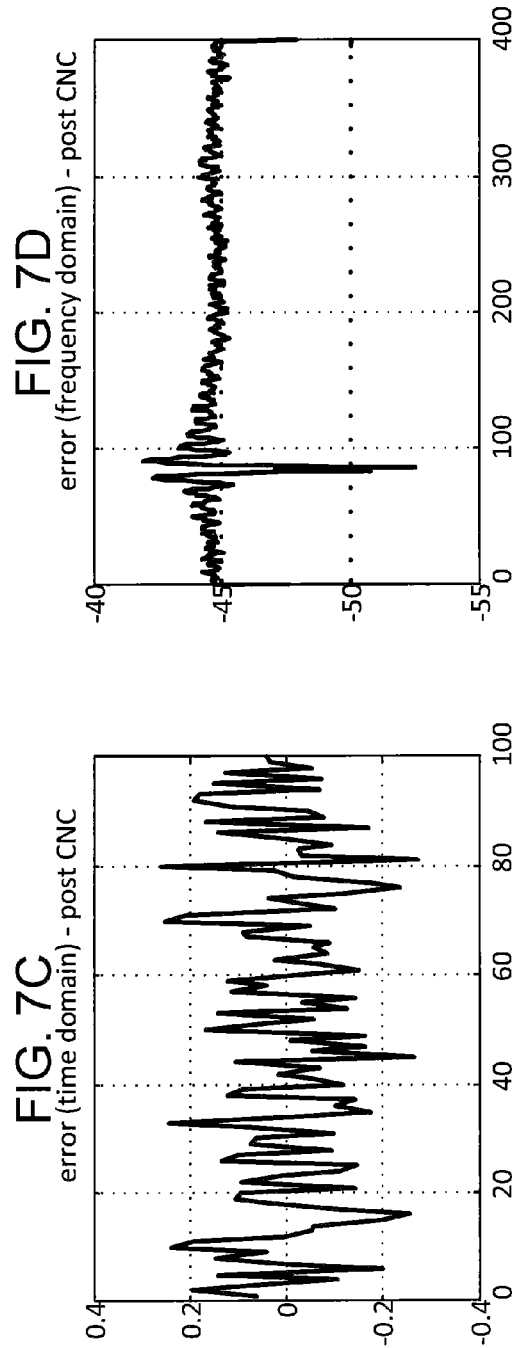

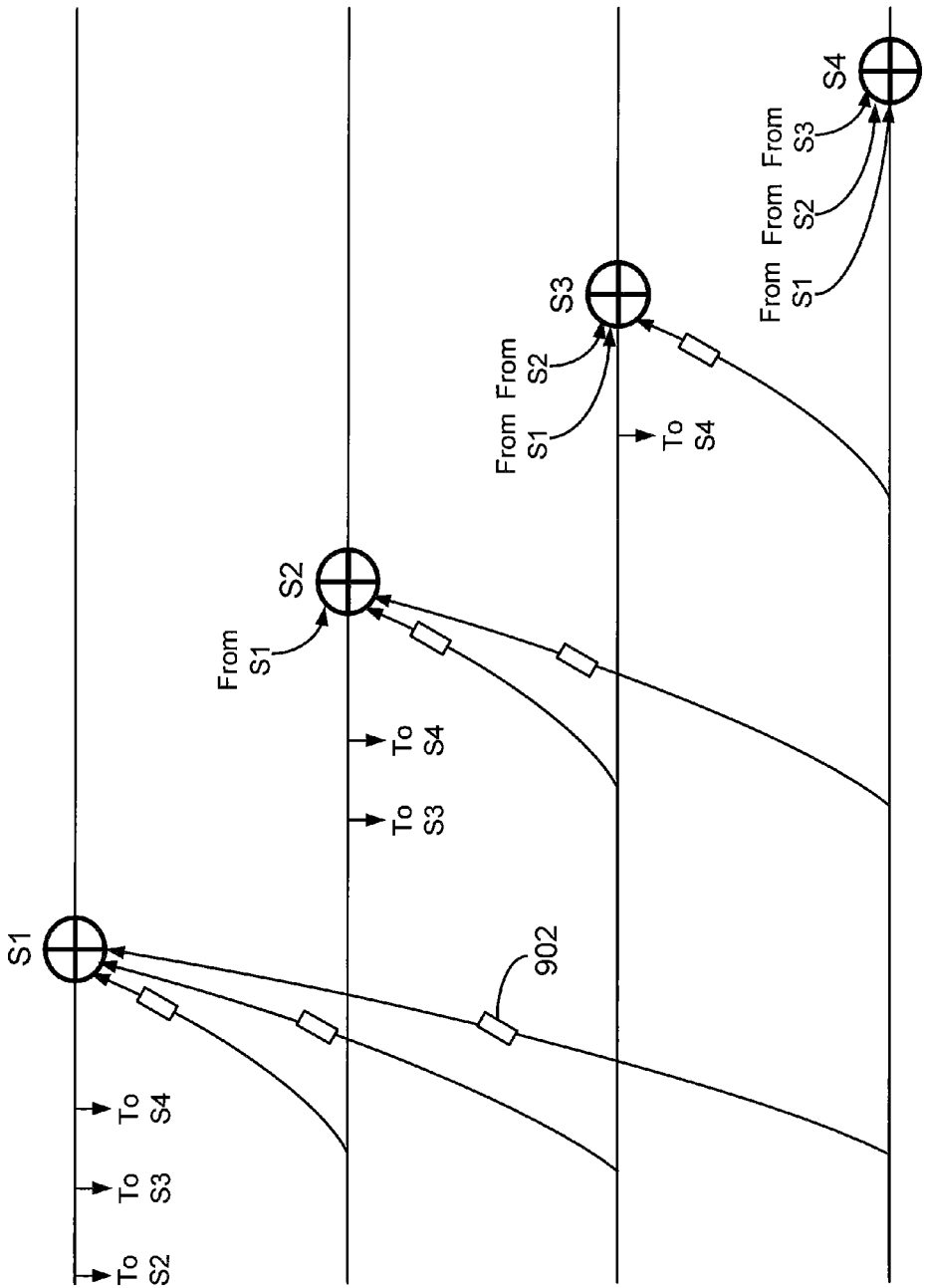

CORRELATED NOISE CANCELLER FOR HIGH-SPEED ETHERNET RECEIVERS

RELATED APPLICATIONS

This application is a Continuation of U.S. patent application Ser. No. 13/309,449, entitled "Correlated Noise Canceller for High-Speed Ethernet Receivers" filed Dec. 1, 2011; the aforementioned priority application is hereby incorporated by reference in its respective entirety.

TECHNICAL FIELD

The disclosure herein relates to electronic communications, and more particularly to reducing correlated noise in high-speed wired electronic communications.

BACKGROUND

10 Gigabit Ethernet is an increasingly popular communication standard, with a nominal data rate of 10 Gbit/s. One form of 10 Gigabit Ethernet is IEEE 10 GBASE-T, used to provide 10 gigabit per second connections over unshielded or shielded twisted pair copper wires. The transmit wire-level modulation for 10 GBASE-T is a Tomlinson-Harashima Precoded (THP) version of pulse-amplitude modulation with 16 discrete levels (PAM-16), encoded in a two-dimensional constellation pattern known as 128-DSQ (Double Square QAM).

The receiver circuitry that receives and processes the transmitted 128DSQ symbols includes a slicer circuit that evaluates the received symbols and produces a preliminary decision of each data value. The decision generally involves taking the input data values at the PAM-16 levels, and assigning values based on the proximity of the received value to a particular PAM-16 level. The decision may be done sample by sample in which case the PAM-16 levels are used, or it can be done on pairs of samples in which case the 128-DSQ grid points are used. A forward error correction mechanism (like LDPC coding) may additionally help to make the right decision of mapping the received symbols to constellation points. This decision mechanism, which may include some level of error correction, is referred to as a slicer in this document. A communication system that is designed to meet performance targets in presence of background Gaussian noise may suffer from a burst of correlated noise, particularly in the form of radio frequency interference (RFI).

One proposal in the art to address RFI involves detecting common-mode noise, and utilizing the detected common-mode noise to filter the effects of RFI. In many cases this works well for its intended applications. However, some implementations utilize a fifth channel, with the common-mode representing the 5$^{th}$ channel (in addition to the four data channels). Providing a fifth channel may cause an increase in package pincount for each transceiver chip. Thus, for some applications, it would be desirable to address the RFI problem in a high-speed ethernet system without the need to employ a 5$^{th}$ channel.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIGS. 7A-7D represent slicer error signals in respective time and frequency domains for both pre-canceller and post canceller nodes of the slicer circuit of FIG. 3;

FIG. 9 illustrates a further embodiment of a MIMO (multiple input multiple output) implementation of the correlated noise canceller in the slicer circuit of 4 receiver channels similar to FIG. 3.

DETAILED DESCRIPTION

Embodiments of a receiver circuit and associated methods of operation are disclosed. In one embodiment, a method of operation in a receiver circuit comprises sampling an input signal to generate a sampled signal having a sampled noise component and a sampled data component. The sampled signal is sliced, and a slicer error determined based on the slicing of the sampled signal. A subsequently sampled noise component is filtered based on the slicer error.

In a further embodiment, a receiver circuit is disclosed. The receiver circuit includes an input sampler to sample an input signal having a sampled noise component. A slicer circuit receives the sampled data and noise components to generate a slicer error signal. A feedback path including a correlated noise canceller is coupled to the slicer circuit to predict a subsequently sampled noise component for summation with a subsequently received input signal. By utilizing slicer error in a feedback context, correlated noise, such as RFI, may be filtered from sampled data to enhance signal fidelity.

Figure 1:
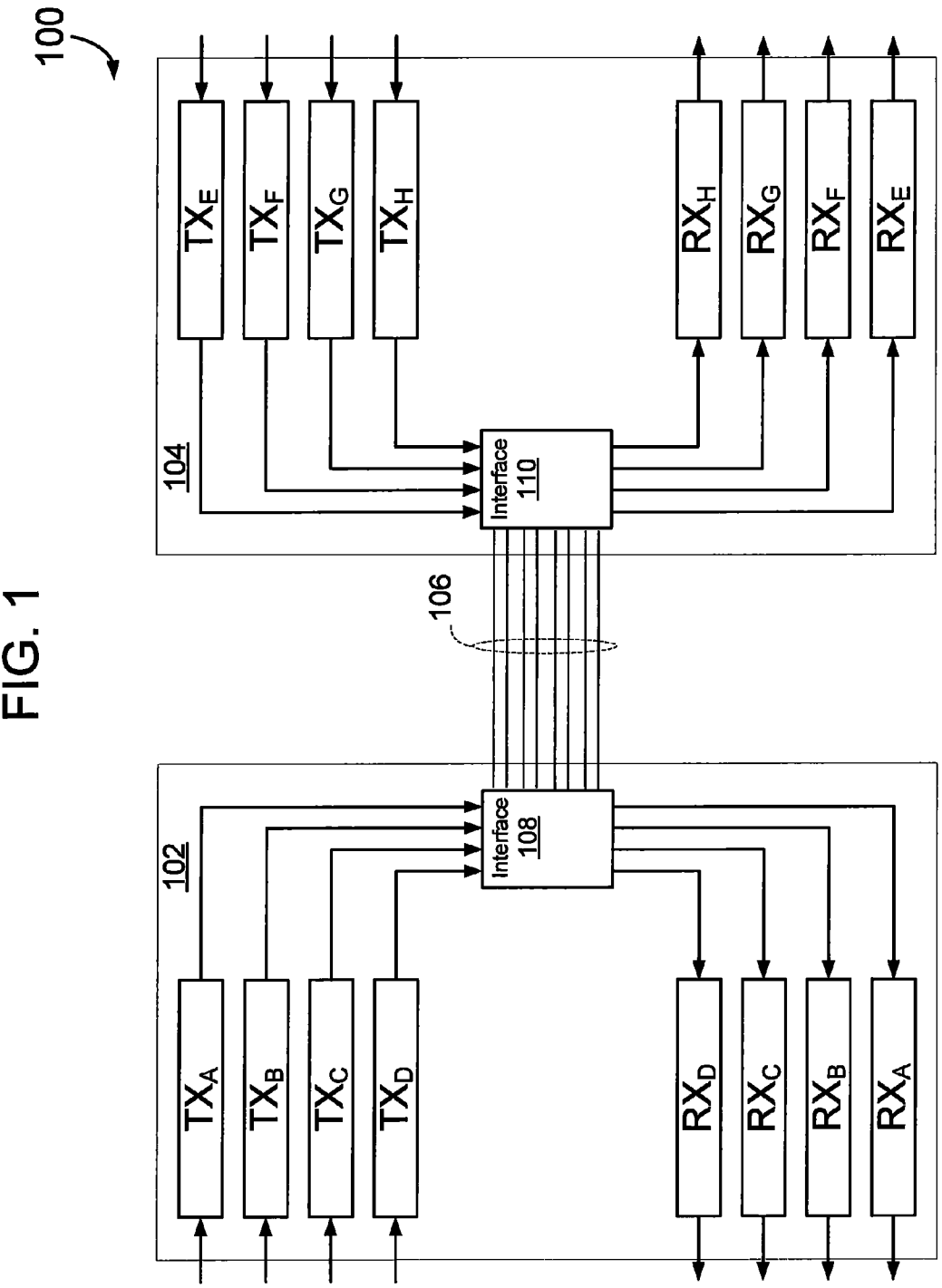
FIG. 1 illustrates a high-level transmitter/receiver channel architecture for the GBASE-T communication standard.

FIG. 1 is a block diagram illustrating one embodiment of a communication system 100. The system includes a first transceiver integrated circuit (IC) or chip 102 and a second transceiver chip 104 that can communicate with each other. The first transceiver 102 includes "transceiver components" including one or more transmitters TX$_A$-TX$_D$ and one or more receivers RX$_A$-RX$_D$. Similarly, the second transceiver 104 includes various transceiver components including one or more transmitters TX$_E$-TX$_H$ and one or more receivers RX$_E$-RX$_H$. The transmitters TX$_A$-TX$_H$ shown in FIG. 1 can be considered individual "transmitters," as typically referenced herein, or can be considered individual transmitter channels which a transmitter block within the transceiver can independently transmit signals on. Similarly, receivers RX$_A$-RX$_H$ can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" associated with each respective transceiver which wants to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver chip 102 can communicate with the second transceiver chip 104 over one or more communication channels of a communication link 106. In one embodiment, such as that corresponding to the 10 GBASE-T Ethernet standard, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners."

An interface 108 can be provided in the first transceiver chip 102 and an interface 110 can be provided in the second transceiver chip 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX).

In one example, from the point of view of the first transceiver chip 102, data transmissions during normal operation from a local transmitter TX are provided to the interface 108, which outputs the data on a corresponding channel of the communication link 106. The data is received by the link partner, the second transceiver chip 104. The interface 110 of the transceiver 104 provides the received data to its receiver RX connected to that same channel. Furthermore, due to noise effects such as near-end crosstalk and echo, the data transmitted by the transmitters is also received by the near-end receivers in the same transceiver. Filters can be used to filter out this noise so that the receivers receive only data from other transceivers. In some embodiments, the transceivers 102 and 104 are asymmetric, such that data transmitted by a local transmitter has no dependence or relation with data being received by the corresponding local receiver.

Figure 2:
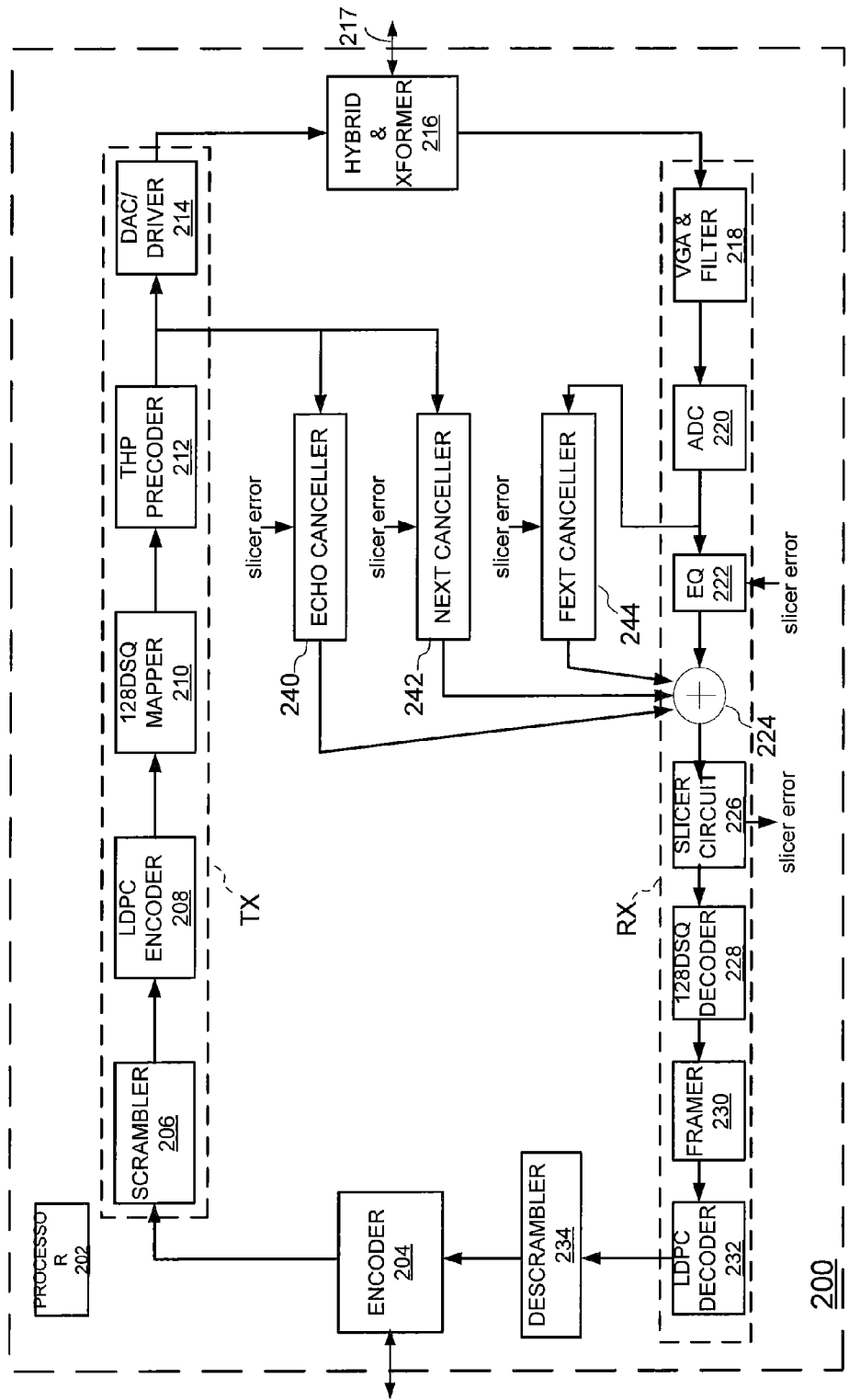
FIG. 2 illustrates one embodiment of a transceiver block diagram used in the architecture of FIG. 1.

FIG. 2 is a block diagram illustrating one example of a transceiver 200. This example is suitable for a 10 GBASE-T standard, but other different configurations and types of transceiver components can be used in other embodiments for 10 GBASE-T or for other, different communication standards. For explanatory purposes, the example shown in FIG. 2 illustrates a single transmitter path/channel and a single receiver path/channel for data. Multiple such paths/channels are provided in embodiments having multiple channels, e.g. four of the transmitter paths and the receiver data paths shown in FIG. 2 are used in the GBASE-T standard.

One or more processors 202 are typically included in transceiver 200, or connected to the transceiver, to control various operations for the transceiver components. Furthermore, additional hardware and/or software/firmware can be provided to implement the components themselves and can include processor functionality.

In the transmitter portion TX (denoted in phantom) of the transceiver 200, an encoder/decoder 204 can be used to encode data desired to be transmitted in a particular desired format or standard, followed by a scrambler 206 for self-synchronized scrambling of the data to be transmitted, providing clock transitions, a statistically random power spectrum for EMI (electromagnetic interference) control, equalizer convergence, etc. A low density parity check (LDPC) encoder 208 encodes the data according to the parity check for error correction. A 128DSQ mapper 210 (or other type of mapper) then can use a coset-partitioned constellation to map the data to symbols, and each 128-DSQ symbol is transmitted using two back-to-back PAM-16 signals (Pulse Amplitude Modulation, 16 levels). A Tomlinson-Harashima Precoding (THP) precoder 212 can then adjust the signal to assist the far-end receiver in performing signal equalization. An analog front end (AFE) for the transmitter can include a digital-to-analog converter (DAC) and driver block 214 which converts the data to analog form for transmission and transmits the data via the hybrid coupler and transformer block 216 to the channel 217.

Different embodiments can implement the hybrid and transformer block 217 differently. For example, in some embodiments the transformers may be separately connected directly to the communication link, and the hybrid coupler is connected between the transformers and the rest of the transceiver components. Other embodiments may provide transformers between hybrid and the other transceiver components, or another configuration.

Figure 3:
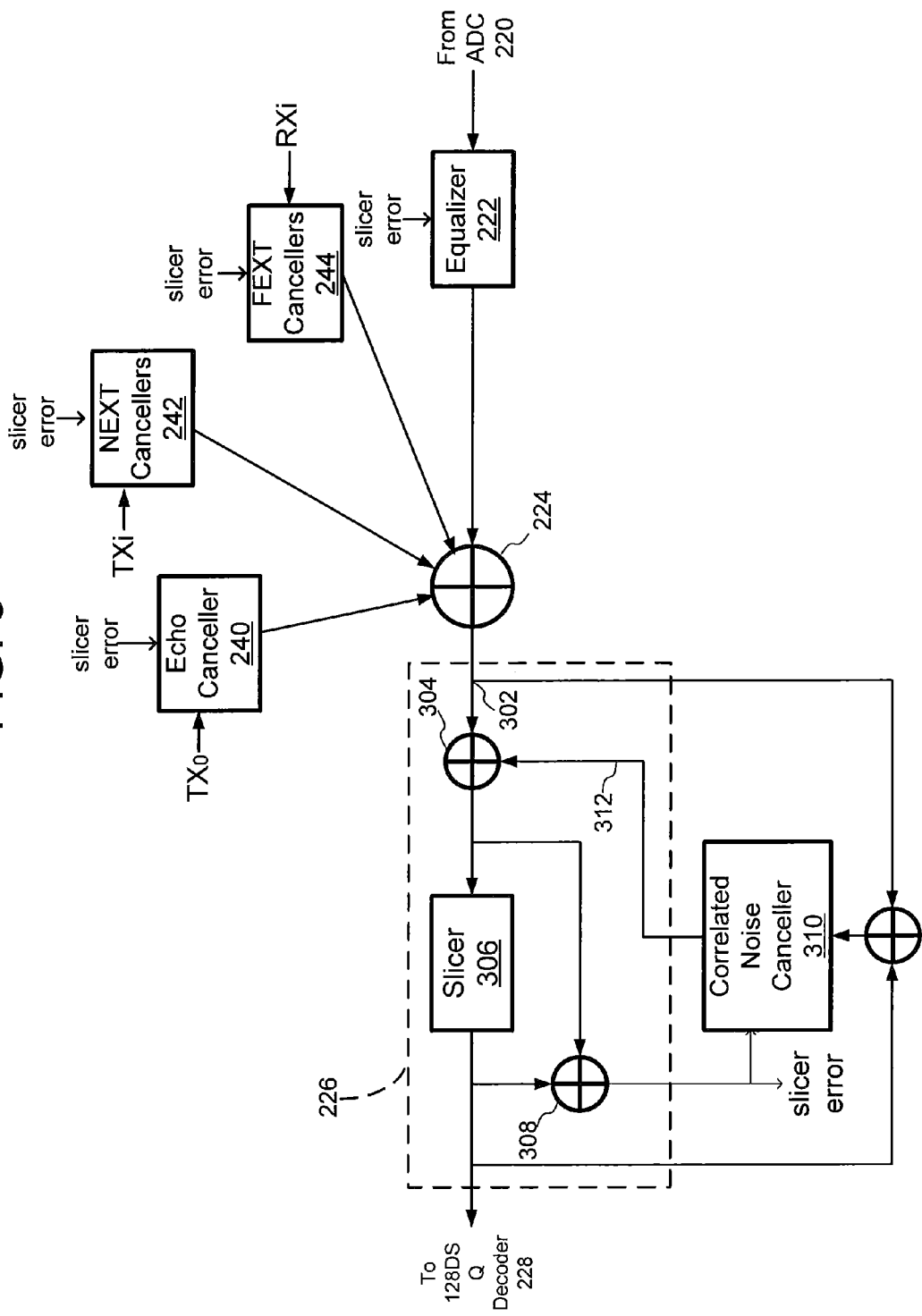
FIG. 3 illustrates one embodiment of correlated noise canceller in a slicer circuit for use in the transceiver architecture of FIG. 2.
Figure 4:
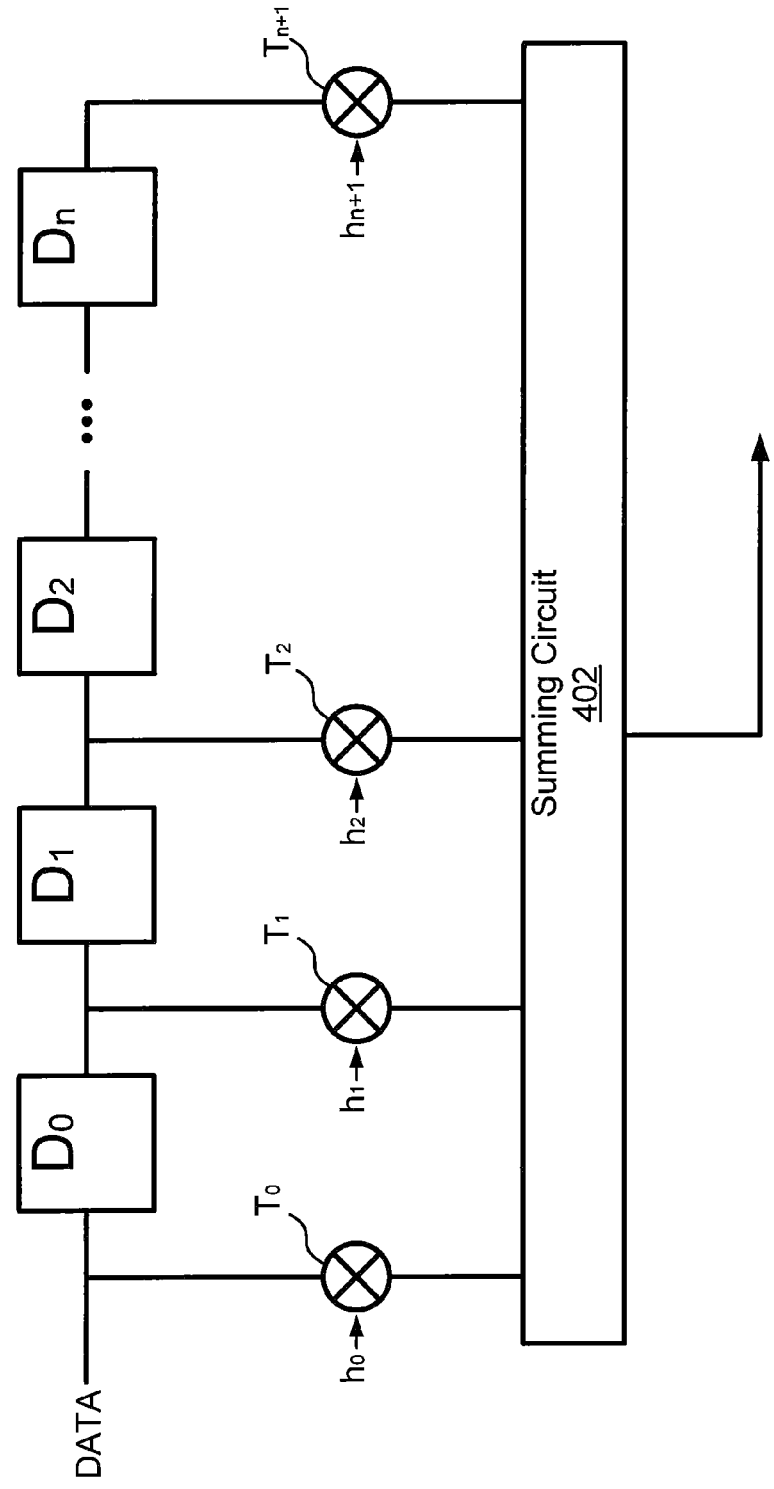
FIG. 4 illustrates one embodiment of an FIR (finite impulse response) implementation of the correlated noise canceller for use with the slicer circuit of FIG. 3.

In a receiver portion RX (in phantom) of the transceiver 200, data is received at the hybrid coupler 216. As noted above, four data communication channels are used in a 10GBASE-T embodiment (other amounts of channels can be used in other embodiments), and are sent to an analog front end (AFE) for the receiver which can include a variable gain amplifier (VGA) and filter 218 for filtering, and an analog-to-digital converter (ADC) 220. An equalizer circuit 222 receives sampled signals from the ADC and can include one or more equalizers to reduce inter-symbol interference (ISI) effects on the data. The output of the equalizer circuit 222 is summed with the outputs of a plurality of filters 240, 242, and 244 at adder 224, and the output of the adder provided to a slicer circuit 306. Further details regarding an embodiment of the slicer circuit are shown in FIGS. 3 and 4, and described below. The signal can then be provided to a DSQ128 decoder 228, which outputs decoded data to a framer 230 that extracts frames from the received data and provides the frames to an LDPC decoder 232. The LDPC decoder generally performs an error-correction process on the data. The data can then be provided to a descrambler 234 which outputs de-scrambled data to the encoder/decoder 204 for decoding. The decoded signals are then fed to a connected computer system, processor, or other device.

The filters 240, 242 and 244 are used to reduce echo and crosstalk (NEXT and FEXT) noise which may be introduced in the transmission and reception of data over one or more of the four communication channels. Filters can include an Echo canceller 240, a Near End Crosstalk (NEXT) canceller 242, and a Far End Crosstalk (FEXT) canceller 244. The filters cancel out the effect of signal echo and crosstalk from adjacent lines to achieve an acceptable bit error rate. The output of the THP precoder 212 in the transmitter portion of the transceiver 200 is provided to the Echo canceller 240 and the NEXT canceller 242, which calculate the values for cancellation of echo and NEXT and output these values to the adder 224. Similarly, the output of ADC 220 is provided to the FEXT canceller 244, which calculates the values for cancellation of FEXT and outputs the values to the adder 224. The digital values of echo and crosstalk calculated by the filter are subtracted from the incoming noisy analog data (digitized by ADC 220) by adder 224 to provide received data on each channel with reduced noise. As explained in further detail below, each of the filters includes an input to accept a slicer error value fed back from the slicer circuit 226. As explained below, the slicer error feedback enables a significant reduction in correlated noise without the need for a common-mode fifth channel.

FIG. 3 illustrates one embodiment of a slicer circuit 226 for use in the transceiver 200 of FIG. 2. The various echo, NEXT and FEXT filters 240, 242, and 244 from FIG. 2 are also shown for context purposes. The slicer circuit 226 includes an input node, at 302, that feeds an input adder 304. The adder, in turn, couples to a slicer 306. An output adder 308 receives the input signal to the slicer, and the output from the slicer to generate a slicer error signal ("slicer error").

Further referring to FIG. 3, the slicer error signal is fed to a correlated noise canceller 310, where a filtered output is generated based on the slicer error, and fed back along a feedback path 312 to the input adder 304. The slicer error signal is also fed as an input to the echo canceller 240, the NEXT canceller 242, the FEXT canceller 244 and the equalizer 222. An additional summer 314 receives sampled data from the input node 302 and the output of the slicer circuit, at 316, and produces a second error signal fed to the correlated noise canceller 310.

In one embodiment, the correlated noise canceller 310 is realized as an adaptive filter that continually adapts, and more particularly a finite impulse response (FIR) filter. While the structure and operation of FIR filters are generally well-known to those skilled in the art, FIG. 4 illustrates a high-level implementation that includes a plurality of delay elements D0-Dn, for delaying respective data samples. A number of taps T0-Tn corresponding to the delay elements are respectively coupled to delay output nodes. The taps receive respective weights or coefficients h0-hn+1 that represent factors applied to a sequence of data samples. A summing circuit 402 receives weighted samples, averages them, and outputs a filtered value.

The length of the adaptive filter, or number of samples to evaluate and average to determine an output, is selectable for a user depending on the application involved. Implications involving amplifier gain may warrant the use of only one sample (weighted with a gain or tap value of 1) or many samples (weighted with a corresponding number of low-gain values). Generally, however, the longer the filter, the less correlation in the noise, and correspondingly less predictability. As discussed below, high gain values may have a tendency to promote error propagation, and possibly cause filter non-convergence.

A variety of algorithms may be employed to derive values for the selected number of tap weights, or coefficients. Least mean squares (LMS) and minimum mean square error are 2 of well known algorithms. One variant to adapt the coefficients is to "regularize" the filter by utilizing a least squares algorithm, as is well-known in the art. As an example, one might use the least squares algorithm to find a solution that minimizes gain for the coefficients. Another possible algorithm to employ is the least mean squares method, which provides a leakage term that allows each adaptation step to "leak" a little bit away from the result so that the output doesn't grow too large too fast (thus, avoiding a high gain situation). In a further embodiment, the taps may have programmable saturation levels to maximize tap gain levels.

In operation, the slicer circuit structure described above takes advantage of the fact that correlated noise, such as that typically associated with RFI, may be predictable in many cases based on historical statistics. Thus, by sampling correlated noise over time, and assuming that the sampled noise is correlated between samples, evaluating the history of the noise may be a reliable predictor of future noise. Further, by predicting the future noise, it can be filtered/canceled from a current sample to enhance the signal fidelity of the system. Note that the use of the term "cancellation" is not meant to require a complete cancellation of a target signal, but rather a significant mitigation or reduction of the target signal that provides the advantages noted herein.

Figure 5:
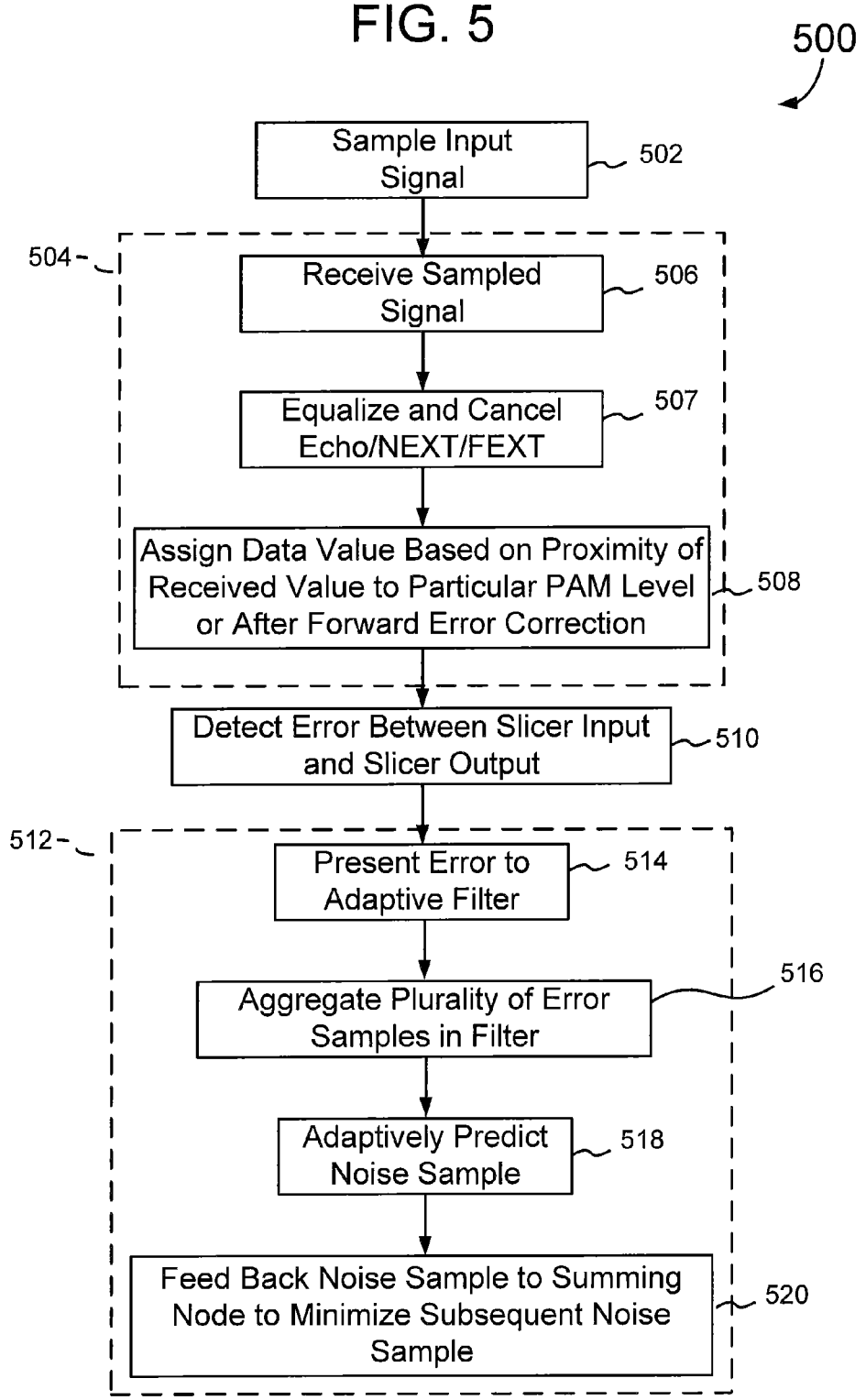
FIG. 5 is a flow diagram of one embodiment of a method of cancelling correlated noise.
Figure 6A:
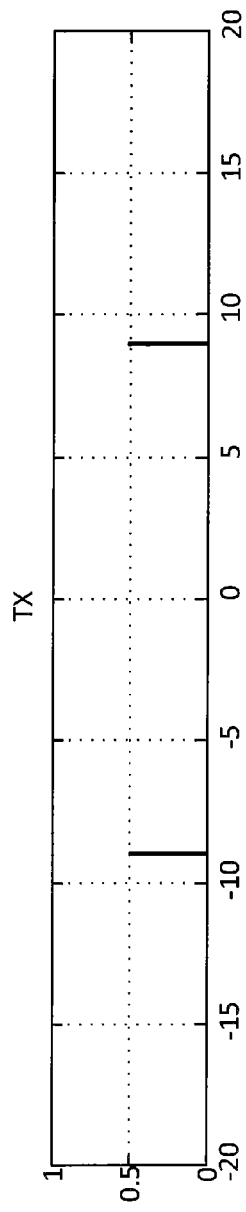
FIGS. 6A-6D represent simplified data histograms for one example of a PAM 2 signal at various locations in the circuit and architecture of FIGS. 2 and 3.
Figure 6B:
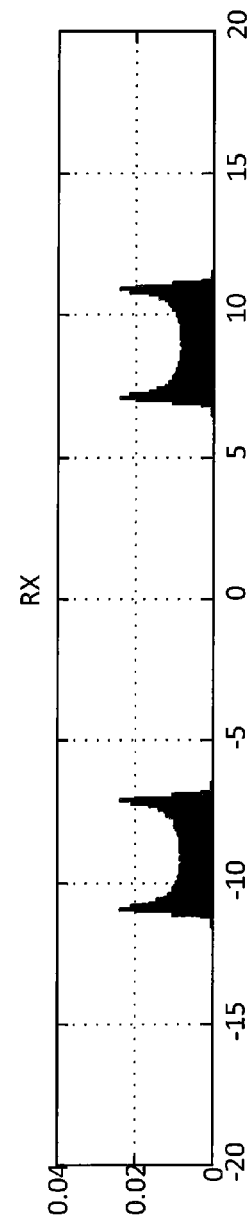

FIG. 5 illustrates a method of operation, generally designated 500, of the circuitry involving the slicer circuit of FIG. 3. Transmitted data symbols in the form of multi-PAM signals are transmitted by the transmitter circuitry TXA-TXD of a first transceiver chip 102 (FIG. 1) and received by the corresponding receiver circuitry of another chip 104. FIG. 6A illustrates a histogram representing PAM-2 signals at two signaling levels (approximately +9 and −9 along the x-axis) from a transmit side of a signaling system (for ease of illustration and explanation, it is assumed that PAM-2 signals are being transmitted rather than PAM-16 signals). The hybrid coupler 216 (FIG. 2) receives the symbols and passes them to the VGA and filter 218 and subsequently the ADC 220. A histogram representing the received signals with correlated sinusoidal noise is shown in FIG. 6B. The ADC 220 then samples the received input signals, at step 502, which are passed to the slicer circuit 226 for slicing, at step 504. The slicing involves receiving the sampled signals, at 506, equalizing and cancelling the echo/NEXT/FEXT components, at step 507, then assigning data values based on the proximity of the received values to a particular PAM level, or after forward error correction, at step 508. Once the slicing for a particular sample is carried out, the error between the slicer input and the slicer output is detected, at step 510.

Figure 6C:
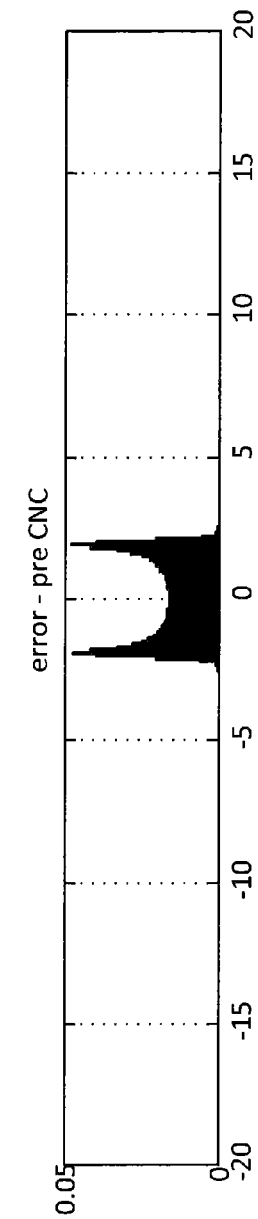
Figure 6D:
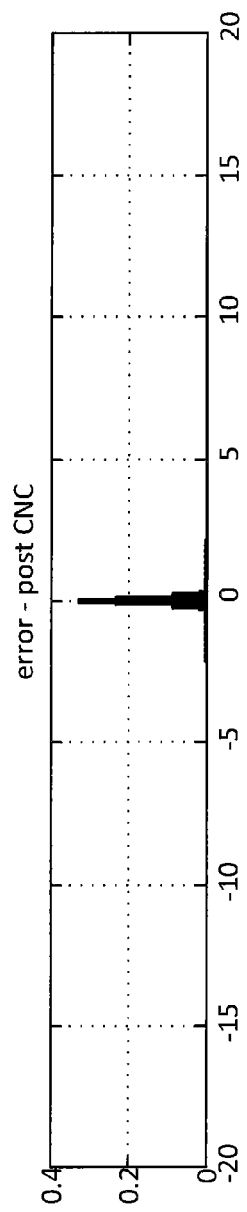

Further referring to FIG. 5, following detection of the slicer error, a series of steps are carried out that result in feeding back a cancellation signal to various circuit components based on the slicer error, at step 512. The sub-steps involve first presenting the slicer error to the correlation noise canceller, at step 514. FIG. 6C illustrates a histogram of slicer error in the presence of sinusoidal noise as presented to the canceller, while FIGS. 7A and 7B illustrate the slicer error in respective time and frequency domains. In one embodiment, as explained above, the canceller is in the form of an adaptive filter that aggregates a plurality of error samples, at step 516. The error samples are acted upon within the filter with weightings applied and averaging carried out as described above. The filter generates a filtered output that represents a noise sample prediction, at step 518, to offset an expected subsequent noise sample. The predicted noise sample is then fed back to the summing node 304 to iteratively assist in cancelling the RFI noise. FIG. 6D illustrates a Gaussian histogram that shows the resultant noise after reducing the RFI through application of the predicted noise component, while FIGS. 7C and 7D illustrate the resulting signal output from the correlated noise canceller in respective time and frequency domains.

Figure 8:
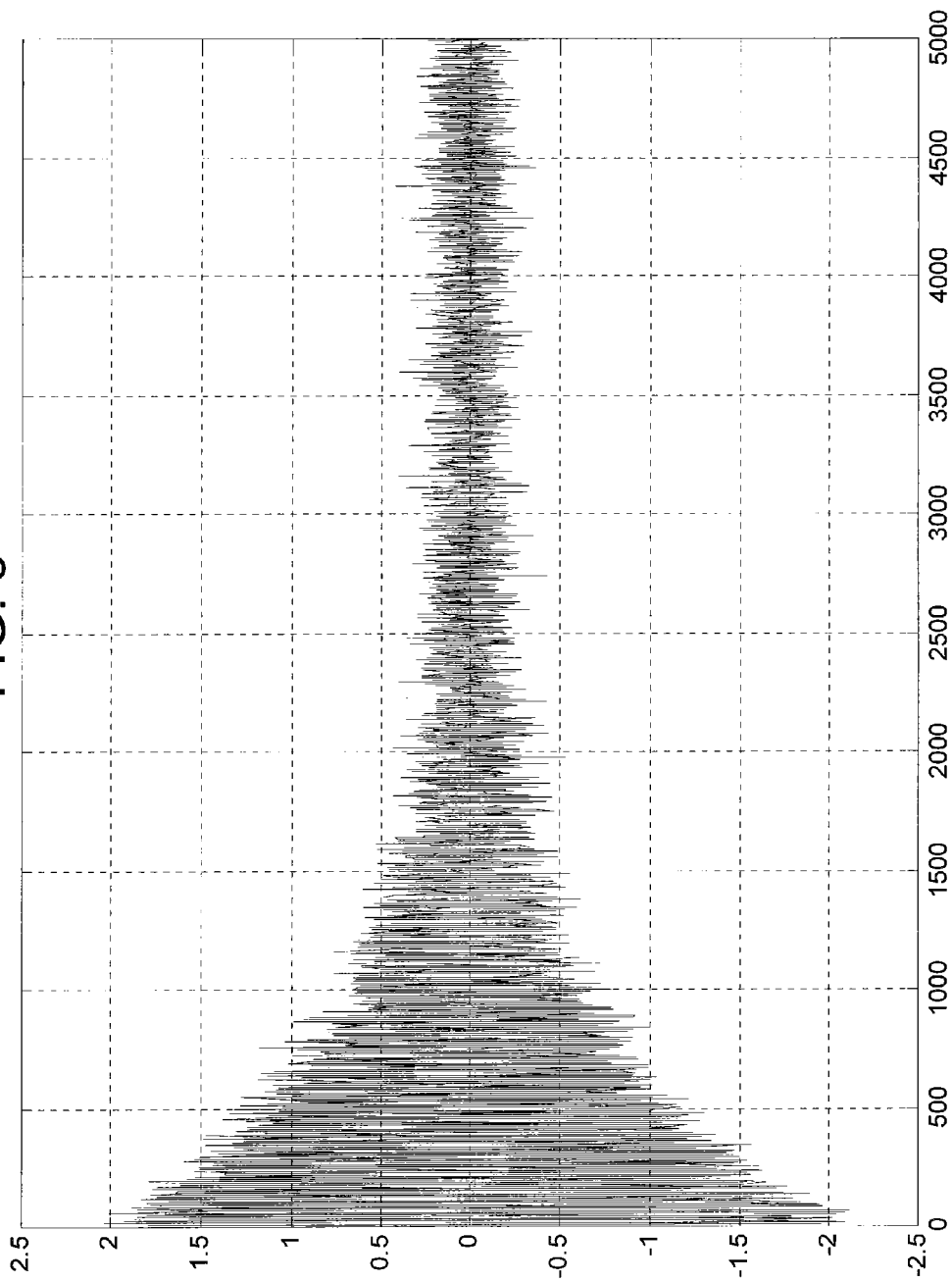
FIG. 8 is a graphical representation of the filter of FIG. 4 converging on a solution based on slicer error.

The error samples are also fed to the echo filter 240, NEXT filter 242, FEXT filter 244 and equalization circuitry 222 to provide the required information for their adaptation. As the transceiver 200 continues to operate, the correlated noise canceller continues to iteratively adapt its error sample predictions in a manner that eventually converges to a solution. FIG. 8 illustrates such a convergence. Thus, the correlated noise canceller 310 provides a way for the transceiver circuit 200 to effectively filter the effects of RFI without necessarily needing an additional channel to, for example, provide a common mode signal indicative of RFI noise for cancelling by an adaptive filter.

FIG. 9 illustrates a high-level embodiment of a correlated noise cancellation architecture similar to that discussed above, but that operates across multiple receiver channels. The architecture includes a plurality of channels C1-C4 that correspond to the twisted wire pairs 106 of FIG. 1. In one embodiment, the channels cross-couple slicer error in a multiple-input-multiple-output (MIMO) fashion to cancel the effects of RFI. Generally, each channel may include structure as described above with respect to FIGS. 2-4, but additionally involve cross-channel summing nodes S1-S4 that each receive the slicer error signals from the other channels through respective filters such as that shown at 902. In this way, slicer error for current and previous samples from the other channels may be used in the adaptation for a particular channel to more accurately determine the predicted noise samples for that channel.

In other embodiments, the MIMO architecture described above may be simplified by aggregating slicer error from all the channels to less than all of the channels. In one embodiment, slicer error signals from three channels are summed at a fourth channel only. One way to prioritize which channel(s) will receive the slicer error (from the other channels) is to determine the channel(s) with the highest SNR. This choice will minimize the noise that is fed back by the correlated noise cancellers. Another way to prioritize is to choose a channel with the strongest RFI signal. In this case the correlated noise canceller will create a weaker feedback path that reduces the noise that is injected back and also it reduces the chance of error propagation. Depending on the application, tradeoffs in gain versus SNR may need to be made to optimize circuit operation.

Those skilled in the art will appreciate the benefits and advantages afforded by the transceiver slicer circuitry and method described above. By minimizing the effects of RFI with the correlated noise canceller, a fifth channel may be avoided. This minimizes the number of package connections for each transceiver chip. Moreover, utilizing a correlated noise canceller provides a straightforward implementation scheme that provides cancellation even without the most recent samples.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A method of operation in an Ethernet receiver circuit comprising:

for each of a plurality of channels,
sampling an input live Ethernet data signal to generate a sampled signal having a sampled correlated noise component caused by an interfering signal, and a sampled data component, the sampled correlated noise component being correlated to a previously sampled correlated noise component;
equalizing the sampled signal to generate an equalized signal;
summing, at a summer, the equalized signal with compensation signals from respective near-end crosstalk (NEXT) and far-end crosstalk (FEXT) filters to generate a summed signal;
feeding the summed signal as an input to a slicer circuit;
slicing the summed signal with the slicer circuit;
determining a slicer error based on a difference between the summed signal and a signal produced at the output of the slicer circuit;

feeding the slicer error to a correlated noise filter;
filtering the slice error to generated a correlated noise compensation signal for feeding to the summer to cancel at least a portion of the interfering signal;
wherein the summing includes summing the equalized signal with respective correlated noise compensation signals fed from the other of the plurality of channels.

2. The method according to claim 1 wherein the filtering comprises adaptively filtering.

3. The method according to claim 1 wherein the filtering comprises:
predicting a subsequent sampled noise component based on the slicer error; and
subtracting the predicted subsequent sampled noise component from a subsequently sampled signal.

4. The method according to claim 3 wherein the subsequent sampled noise component includes evaluating a plurality of previous samples.

5. The method according to claim 4 wherein the plurality of previous samples are each weighted differently in the evaluating.

6. An Ethernet receiver circuit comprising:
a plurality of channels, each channel including
an input sampler to sample an input live Ethernet data signal having a sampled correlated noise component caused by an interfering signal, the sampled correlated noise component being correlated to a previously sampled correlated noise component;
an equalizer to equalize the sampled noise component;
a summer to sum the equalized sampled noise component with compensation signals from respective NEXT and FEXT filters and generate a summed signal;
a slicer circuit to receive the summed signal to generate a slicer error signal, the slicer error signal based on a difference between the summed signal and a signal produced at the output of the slicer circuit;
a feedback path including a correlated noise canceller coupled to the slicer circuit to receive the slicer error signal and predict a subsequently sampled noise component for summation with a subsequently received input signal to generate a correlated noise compensation signal to cancel at least a portion of the interfering signal:
wherein the summer further receives respective correlated noise compensation signals fed from the other of the plurality of channels.

7. The Ethernet receiver circuit according to claim 6 wherein the noise component is based on a sinusoidal noise source.

8. The Ethernet receiver circuit according to claim 7 wherein the sinusoidal noise source comprises radio frequency interference (RFI).

9. The Ethernet receiver circuit according to claim 6 wherein the correlated noise canceller comprises an adaptive filter.

10. The Ethernet receiver circuit according to claim 9 wherein the predicted noise component is based on one or more previous noise samples.

11. The Ethernet receiver circuit according to claim 10 wherein each noise sample is associated with a tap weighting.

12. The Ethernet receiver circuit according to claim 9 wherein the adaptive filter includes a selectable number of taps.

13. The Ethernet receiver circuit according to claim 12 wherein the adaptive filter converges on a solution based upon a leakage term-based algorithm.

14. The Ethernet receiver circuit according to claim 12 wherein the adaptive filter converges on a solution based upon a regularization-based algorithm.

15. The Ethernet receiver circuit according to claim 6 embodied as a 10GBASE-T transceiver circuit.

* * * * *